Dec. 31, 1968   K. S. WORLEY   3,419,298
JOINT INCLUDING TELESCOPING BOLT ASSEMBLY
Filed Nov. 28, 1966
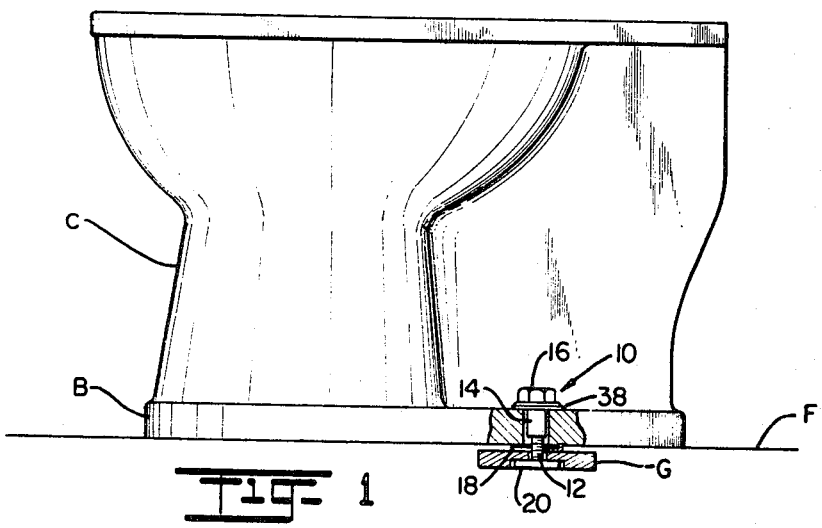
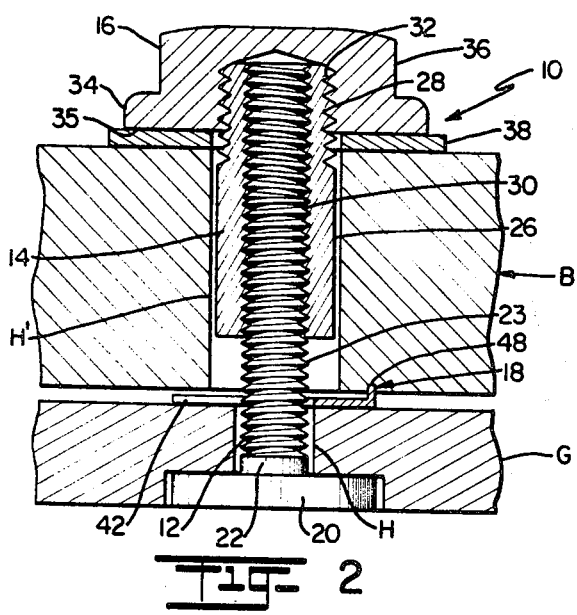
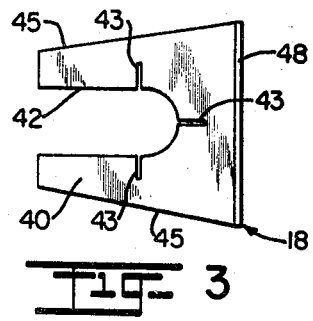
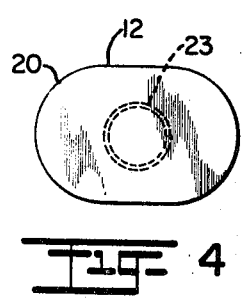
INVENTOR.
KENNETH S. WORLEY
BY
*John E. Reilly*
ATTORNEY

United States Patent Office 3,419,298
Patented Dec. 31, 1968

3,419,298
JOINT INCLUDING TELESCOPING BOLT ASSEMBLY
Kenneth S. Worley, Fort Collins, Colo., assignor to Telescopic Bolt Company, Fort Collins, Colo., a corporation of Colorado
Filed Nov. 28, 1966, Ser. No. 597,280
5 Claims. (Cl. 287—189.36)

ABSTRACT OF THE DISCLOSURE

A telescoping bolt assembly facilitates installation of a closet bolt through utilization of a series of bolt members extending upwardly through bolt openings from the blind side of a flange mounted in the floor and partially into aligned bolt openings in the base of the closet bolt, and a corresponding series of telescoping sleeve members are inserted downwardly through each bolt-receiving opening in the base portion for threaded engagement with the upper ends of the bolts. An upper cap threadedly engages the upper exposed end of each sleeve to tighten the bolt assembly and fasten the members together, and a locking member serves to secure the bolts against rotation when the upper caps are tightened on the sleeves.

---

This invention generally relates to new and useful improvements in fasteners, and more particularly relates to a telescoping bolt assembly being adaptable for use in the installation of closet bowls.

It is customary to anchor a closet bowl in the floor by means of a series of bolts arranged for extension upwardly through a gasket or flange in the floor and through the base of the closet bowl. Suitable nuts and washers are placed on the upper exposed ends of the bolt and tightened down against the upper base surface to secure the closet bowl firmly in place. On account of varying thicknesses and sizes of the closet bowl at the base area, any excess portion of the bolt above the nut and washer is cut off leaving the remainder of the bolt and nut connection exposed. In some cases a cap is bonded to the upper base surface so as to cover the exposed end of the bolt. It is proposed however to simplify this installation through the use of a telescoping bolt assembly which is readily conformable for use with closet bowls having different base sizes and thickness ranges, and where the bolt assembly is so designed that in tightening the base of the closet bowl against the flange area it will at the same time effectively seal the bolt assembly, leaving no part exposed and avoiding the necessity of cutting off any excess bolt portion. In this relation, it is desirable that the bolt assembly when tightened in place will effectively be self-locking and establish a firm, sealed connection of the closet bowl to the flange and floor surface.

It is therefore an object of the present invention to provide an improved bolt assembly for anchoring closet bowls and the like in place which is inexpensive, time and labor saving in assembly requires a minimum number of parts and results in a rigid, sealed, sanitary installation.

It is another object of the present invention to provide for a telescoping bolt assembly being readily conformable for use in different applications, and which is adjustable in length according to relative thicknesses of the members to be fastened and will effect a positive, sealed connection between the members.

It is a further object of the present invention to provide for a novel and improved telescoping bolt assembly for closet bowls and the like wherein a series of bolt members are installed for upward extension from the blind side of a flange mounted in the floor through bolt-receiving openings in the outer peripheral base portion of the bowl, each bolt being fastened to the base of the bowl through the cooperative use of a telescoping sleeve inserted through each bolt-receiving opening into threaded engagement with the bolt and an upper cap threadedly engaging the upper end of the sleeve, the cap being operative to tighten the bolt assembly and to effectively seal the entire bolt assembly within the base of the bowl.

In accordance with the present invention, a unique form of telescoping bolt assembly is adaptable for use in the installation of closet bolts and comprises the combination of inner and outer concentric telescoping members being dimensioned for extension inwardly from opposite sides of a flange mounted in the floor and of the base portion of the closet bolt through aligned bolt-receiving openings therein, one of the members being in the form of an externally threaded shank extending upwardly through the flange and partially into the base portion and the other of the members including an internally threaded sleeve to receive the upper end of the shank in threaded, telescoping relation. The shank is formed with an enlarged head at its lower end which abuts against the blind or lower side of the flange and a lock member engages the shank portion against the upper surface of the flange to secure the shank against rotation. In order to tighten the base and flange securely together, an enlarged cap nut provided with an internally threaded recess threadedly engages the upper exposed end of the sleeve so that when the cap nut is tightened on the sleeve it will cause further downward threaded movement of the sleeve along the shank until the cap nut is advanced into firm engagement with the upper surface of the base. Accordingly the telescoping bolt assembly is readily conformable for fastening together relatively thick members merely through the expedient of tightening one end of the bolt assembly.

The above and other objects, advantages and features of the present invention will become more readily appreciated and understood from a consideration of the following detailed description, when taken together with the accompanying drawings in which:

FIGURE 1 is a side elevational view of a preferred form of telescoping bolt assembly for installation of a closet bowl.

FIGURE 2 is a view in more detail, partially in section, of the preferred form of bolt assembly.

FIGURE 3 is a detailed plan view of a lock washer forming a part of the bolt assembly; and FIGURE 4 is a bottom plan view of the bolt element comprising a part of the bolt assembly.

The features and advantages of the present invention may be best exemplified by reference to use of the preferred form of telescoping bolt bolt assembly 10 in the installation of a closet bowl C in a floor surface F. Conventionally, an opening is formed in the floor for a sewer line connection or extension pipe, not shown, and a suitable flange G is positioned within the opening for connection for the closet bowl to the upper terminal edge or rim of the sewer line connection, the flange being of a size and configuration to conform to the outer periphery of the base B of the closet bowl. Of course, the thickness and configuration both of the flange and base may vary within limits; and in accordance with the present invention, each bolt assembly 10 must be variable in length according to the thickness of elements to be interconnected. In this relation the flange is formed with bolt-receiving openings H at spaced intervals to be aligned with correspondingly spaced bores or opening H' in the base of the bowl.

In order to fasten the base of the closet bowl as a permanent, sealed installation, a telescoping bolt assembly 10 is arranged for extension through each of the aligned bolt-receiving holes in the flange G and base B. Essentially, the bolt assembly is comprised of elognated, inner and outer concentric male and female telescoping members 12 and 14, respectively, being arranged for extension from opposite sides of the flange G and base B into threadedly adjustable, connecting relation. Preferably the male member is dimensioned to project upwardly through the flange and partially into the bore H' in the base, and the female member is dimensioned to project downwardly through the bore H' in the base but with a portion of the female member being left to project upwardly from the upper surface of the base for threaded engagement with a cap 16. Thus, when the cap 16 is tightened upon the female member 14 and urged into engagement with the upper surface of the base B, it will serve to tighten the base B against the flange while sealing off the bolt assembly and bolt-receiving holes against the entry of foreign matter. To further facilitate secure installation of the members, a lock washer 18 is positioned in surrounding relation to the male member 12 and against the upper surface of the flange G, the lock washer acts as a keeper to exert upward pressure on the male member holding it in position firmly against the flange prior to threaded connection of the female member 14 and cap 16.

Now considering in more detail the construction and arrangement of elements comprising the bolt assembly, the male member 12 is preferably defined by a bolt element having an enlarged head 20 and a shank portion 22 which is externally threaded as at 23 throughout its substantial length. Preferably the head 20 is of generally oval configuration and is relatively thin and flat so as to fit snugly within a limited recess area which is countersunk in the undersurface of the flange at the end of the bore H whereby the bolt is held against rotation when threadedly engaged by the member 14. In turn, the shank portion 22 is dimensioned to project upwardly through the hole H in the flange and partially into the through-bore H' of the base B and its extent of projection will of course vary according to the relative thickness of the flange and base elements.

The female member 14 is in the form of an outer concentric sleeve being of sufficient length to extend through the substantial thickness of the base B. The external surface 26 of the sleeve is dimensioned to be slightly less than the diameter of the bore and has an upper, externally threaded end portion 28. The sleeve is internally threaded as at 30 to mate with and threadedly engage the externally threaded shank 22 in telescoping relation. In this way, the bolt 12 and sleeve 14 are adjustable in length according to the relative thickness of the members G and B so that, notwithstanding variations in thickness of the flange G and base B, the telescoping members 12 and 14 can be threadedly adjusted with a portion of the externally threaded end 28 projecting above the upper base surface.

The cap 16 is provided with a centrally located internally threaded cavity or recess 32 dimensioned to threadedly engage the upper threaded end 28 of the sleeve; also, the cap includes a lower external shoulder 34 having a flat undersurface 35 and an upper hex head portion 36 to permit engagement by a wrench or other suitable means for tightening the cap on the external threaded end 28. According to the length of the telescoping members 12 and 14 relative to the thickness of the flange and base portions, a washer 38 of selected thickness may be interposed between the undersurface 35 of the cap and the upper surface of the base, and it will be evident that one or more washers can be placed over the threaded end 28 depending upon the extent of projection of the threaded end portion 28 beyond the upper surface.

Another feature of the present invention resides in the construction and arrangement of the lock washer 18 which, as best seen from FIGURES 2 and 3, is disposed to rest upon the upper surface of the flange G in surrounding relation to the bolt shank and to exert upward pressure upon the bolt holding it in position for engagement by the sleeve 14. To this end, the lock washer is defined by a relatively thin, flat plate 40 suitably composed of spring steel and having a generally U-shaped, open slot 42 formed in the plate to extend from one end throughout the greater length of the plate. The slot 42 is of a width slightly less than the diameter of the bolt shank 22, and a series of narrow slots or grooves 43 are spaced at intervals around the closed end of slot 42 to permit a limited degree of bending in the plate between the slots 43. In this way, when the bolt shank is inserted through the open slot 42 against the closed end, the closed end is free to undergo limited separation or expansion between slots 43 whereby to yieldingly engage the external surface of the bolt and be biased to urge the bolt head portion 20 upwardly against the undersurface of the flange prior to assembly and tightening of the other fastening elements. The washer 18 is further provided with convergent sides 45 to lend additional strength to the washer about the closed end of the slot, and an upstanding projection or lip 48 at one end of the plate opposite the open end of the slot facilities grasping and handling of the lock washer. It will be evident that a nut may be threaded on the bolt shank against the upper surface of the flange to serve the same purpose as the lock washer. However, the U-shaped lock washer can be laterally advanced into position on the shank and occupy very little space between the flange and base; and by establishing firm engagement both with the flange and bolt shank will discourage turning of the shank with the sleeve and cap screw, In a typical installation of the bolt assembly, the male bolt members 12 are passed through the bolt-receiving openings H in the flange and are held in place by the lock washers 18 as described. The flange is secured in position against the upper end of the sewer line with the bolts 12 projecting upwardly as shown, and the sleeves 14 are threaded a limited distance on the bolts. The base of the closet bowl is then positioned on the flange with the bolts passing upwardly into the bolt-receiving bores H' with a sealant, commonly referred to as bowl wax, inserted between the base and flange in accordance with conventional practice. Thereafter the sleeves 14 are screwed down the necessary distance on the bolt shanks to leave at least a portion of the upper threaded ends 28 exposed above the base. A washer element 38 is placed over the upper end of each sleeve followed by connection of a cap nut 16. It will be noted, if the cap nut reaches its end limit of movement on the sleeve before seating against the upper surface of the base, that continued turning of the cap will cause threaded advancement of the sleeve in relation to the bolt until the cap moves into firm engagement with the base surface. Thus it is necessary only to start the sleeve on the bolt shank and additional threading of the sleeve on the shank is accomplished in tightening the cap nut member.

It will be apparent from the foregoing that the telescoping bolt assembly is effective either in temporarily or permanently fastening elements, particularly where one of the connecting members must be secured from its blind side. As emphasized, the lock washer will retain the male member securely in place and prevent its turning with the sleeve thereby assuring a good tight fit between the elements. Moreover, the telescoping relation established both between the bolt shank and sleeve as well as between the sleeve and cap affords a broad range of adjustability notwithstanding variations in thickness of the elements to be fastened together; and once secured, the cap will automatically seal the entire installation and establish a firm positive connection. The cap nut as described also has useful application in cases where wood screws, designed with upper threaded ends, are employed to anchor a portion of the closet bowl directly into the floor or subflooring. Here the cap nut is tapped to threadedly engage the upper end of the screw and can be tightened to advance the screw into the floor.

While the preferred form of telescoping bolt assembly of the present invention has unique application in the installation of closet bowls as described, it is nevertheless to be understood that various modifications and changes may be made in the detailed construction and arrangement of elements comprising the bolt assembly, as well as the intended use and application, without departing from the spirit and scope of the present invention as defined by the appended claims and reasonable equivalents thereof.

I claim:

1. A telescoping bolt assembly fastening together a pair of elements having aligned bolt-receiving openings therein, said telescoping bolt assembly comprising a pair of inner and outer concentric telescoping members extending inwardly from opposite sides of the elements through the aligned bolt-receiving openings, one of said members having an externally threaded shank and an enlarged head portion at the outer end thereof, means fixing said one member against rotation relative to one of said elements and the other of said members being defined by an internally threaded sleeve having a cylindrical external surface of a diameter less than that of the opening through which said sleeve extends with an externally threaded portion at the outer end thereof, said sleeve receiving said shank in threaded, telescoping relation, and an enlarged cap nut provided with an internally threaded recess having a closed inner end threadedly engaging said externally threaded portion at the outer end of said sleeve.

2. A telescoping bolt assembly according to claim 1 wherein said means is positioned on said externally threaded shank and against one of the elements to be fastened on a side opposite said enlarged head whereby to lock said enlarged head against rotation on the opposite side of the element to be fastened.

3. In a closet bowl installation and the like having an outer peripheral base portion being connected in abutting relation to a flange in which the base portion and flange are provided with aligned bolt-receiving openings, a telescoping bolt assembly comprising a bolt member including an enlarged head portion disposed beneath the flange and a bolt shank portion externally threaded substantially throughout its length and extending upwardly through a bolt-receiving opening in the flange and partially into the aligned opening in the base of the closet bowl, means fixing said bolt member against rotation relative to said flange, a sleeve member of uniform diameter inserted through the bolt-receiving opening in the base, said sleeve being internally threaded and being in telescoping, threaded engagement with said bolt shank, said sleeve including an upper, externally threaded end portion projecting upwardly a limited distance above the base, and a cap nut having an enlarged shoulder with an internally threaded recess threadedly engaging the upper threaded end of said sleeve and being tightened upon said sleeve, thereby forcing said shoulder against the upper surface of the base and in turn threadedly advancing said sleeve on said bolt shank.

4. In a closet bowl installation according to claim 1 wherein said means comprises a spring-loaded lock washer bearing against the inner surface of one of said elements and yieldingly urging said enlarged head upwardly against the undersurface of said one element.

5. In a closet bowl installation according to claim 4, said lock washer being further characterized by having a generally U-shaped open slot of a width less than the diameter of said bolt shank with said bolt shank in close-fitting relation in the closed end of the slot, said lock washer being further internally slotted at spaced intervals about the closed end of the open slot to enable limited expansion and yielding engagement of the edge of the closed end of the slot with said bolt shank.

References Cited

UNITED STATES PATENTS

| | | | |
|---|---|---|---|
| 1,915,640 | 6/1933 | Alsaker | 85—8.8 |
| 2,236,130 | 3/1941 | Betebenner | 85—8.8 |
| 2,252,194 | 8/1941 | Mills | 85—35 |
| 3,028,645 | 4/1962 | Stearman | 151—69 |
| 3,340,760 | 9/1967 | Wormser | 85—8.8 |
| 3,356,401 | 12/1967 | Bertram | 287—189.36 |

CARL W. TOMLIN, *Primary Examiner.*

R. S. BRITTS, *Assistant Examiner.*

U.S. Cl. X.R.

85—1, 8.8, 35; 4—252